(12) United States Patent
Yanes et al.

(10) Patent No.: US 6,501,649 B2
(45) Date of Patent: Dec. 31, 2002

(54) POWER DISTRIBUTION PANEL WITH FLAME CONTAINMENT SLOTS

(75) Inventors: Luis Armando Yanes, Bloomington, MN (US); David E. Schomaker, Lino Lakes, MN (US); Ronald Robert Kurth, Brooklyn Park, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/725,339

(22) Filed: Nov. 29, 2000

(65) Prior Publication Data

US 2002/0064020 A1 May 30, 2002

(51) Int. Cl.[7] ................................................. H05K 7/20
(52) U.S. Cl. ....................... 361/692; 165/80.3; 361/716; 454/184
(58) Field of Search ......................... 363/141; 174/15.1, 174/16.1; 165/80.3; 454/184; 312/236; 361/678, 690, 692, 693, 694, 715–719, 716, 833–835

(56) References Cited

U.S. PATENT DOCUMENTS

| | | | | | |
|---|---|---|---|---|---|
| 4,949,934 A | * | 8/1990 | Krenz et al. | ................ | 361/684 |
| 4,985,803 A | * | 1/1991 | Pum et al. | ................... | 361/687 |
| 5,105,336 A | * | 4/1992 | Jacoby et al. | .............. | 361/690 |
| 5,372,543 A | * | 12/1994 | Steele | ......................... | 454/184 |
| 5,862,037 A | * | 1/1999 | Behl | .......................... | 361/687 |
| 5,969,942 A | * | 10/1999 | Heckner et al. | ............ | 361/695 |
| 5,978,217 A | * | 11/1999 | Kerrigan et al. | ............ | 361/694 |
| 6,104,602 A | * | 8/2000 | Morris et al. | ............... | 361/678 |
| 6,226,182 B1 | * | 5/2001 | Maehara | ..................... | 361/695 |

OTHER PUBLICATIONS

Hendry Telephone Products, 1 page, Power—Intelligent 2/98.*
Printouts From www.Telect.com Mar. 22, 2000 Telect–Panels 1 page.*
Printouts From www.Telect.com Mar. 22, 2000 Telect Total 1 page Front Access.*
Telect, Inc., reference drawing for Telect Product No. 009–8005–0404, copyright 2001.
Telect, Inc., reference drawing for Telect Product No. 009–2448–1001, copyright 1999.
Telect, Inc., reference drawing for Telect Product No. 009–8004–1001, copyright 2001.
Telect, Inc., reference drawing for Telect Product No. 009–0113–1007, copyright 2001.
Telect, Inc., reference drawing for Telect Product No. 009–0112–1002, copyright 2001.
Telect, Inc., reference drawing for Telect Product No. 009–0024–1001, copyright 2000.
Telect, Inc., reference drawing for Telect Product No. 009–0014–1001, copyright 2000.
Telect, Inc., reference drawing for Telect Product No. 009–0012–1004, copyright 2000.
Telect, Inc., reference drawing for Telect Product No. 009–0002–1004, copyright 2000.
Telect, Inc., reference drawing for Telect Product No. 009–0004–1001, copyright 2000.

(List continued on next page.)

Primary Examiner—Gerald Tolin
(74) Attorney, Agent, or Firm—Merchant & Gould P.C.

(57) ABSTRACT

A circuit panel chassis having a plurality of angled slots in a top surface thereof. The angled slots improving flame containment inside the circuit panel chassis while providing for cooling the circuit components of the circuit panel.

17 Claims, 21 Drawing Sheets

OTHER PUBLICATIONS

Hendry Telephone Products document, 2 pages, entitled "Power Distribution, Flexible Series," dated 2/98, pp. 6 and 7.

Hendry Telephone Products document, 2 pages, entitled "Power Distribution, High Density," dated 2/98, pp. 9 and 10.

Hendry Telephone Products document, 2 pages, entitled "Power Distribution, Intelligent," dated 2/98, pp. 17 and 18.

Hendry Telephone Products document, 2 pages, entitled "Power Distribution, Traditional," dated 2/98, pp. 23 and 24.

Telect.com catalog page entitled "Uninterrupted Battery Fuse Panel,", copyright 1999, p. 7.

Telect.com catalog page entitled "Intermediate Fuse Panels," copyright 1999, p. 8.

Telect.com catalog, 2 pages entitled "Circuit Breaker Panel," copyright 1999, pp. 9 and 10.

Telect.com catalog, 2 pages entitled "High Current Circuit Breaker Panel," copyright 1999, pp. 11 and 12.

Telect.com brochure, 2 pages, entitled "Two Fuse Panels in One Rack Space Intermediate Fuse Panel," dated 7/98.

Printouts from www.telect.com dated Mar. 22, 2000, entitled "Telect, Fuse Panels", 2 pages.

Printouts from www.telect.com dated Mar. 22, 2000, entitled "Telect's Traditional Fuse Panels," 3 pages.

Printouts from www.telect.com dated Mar. 22, 2000, entitled "Telect's Total Front Access Fuse Panels," 2 pages.

Printouts from www.telect.com dated Mar. 22, 2000, entitled "Telect's Intermediate Fuse Panels," 2 pages.

Printouts from www.telect.com dated Mar. 22, 2000, entitled "Telect, Circuit Breaker Panel," 2 pages.

Printouts from www.telect.com dated Mar. 22, 2000, entitled "Telect's Circuit Breaker Panel," 2 pages.

Printouts from www.telect.com dated Mar. 30, 2000, entitled "Telect's Uninterrupted Battery Fuse Panel," 4 pages.

* cited by examiner

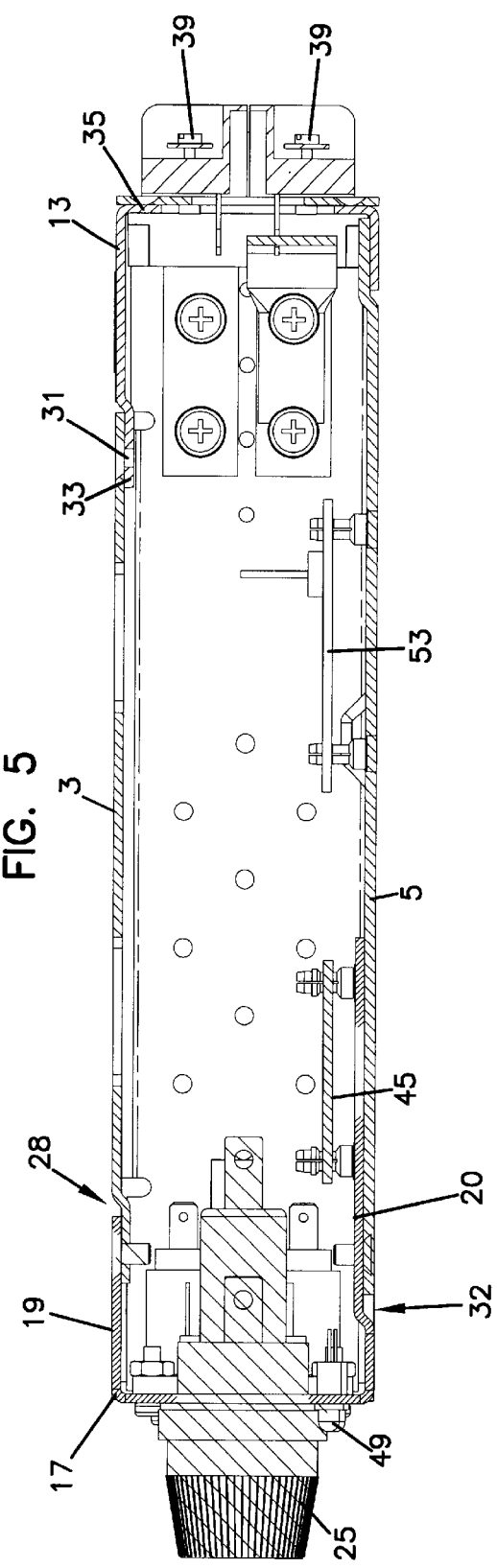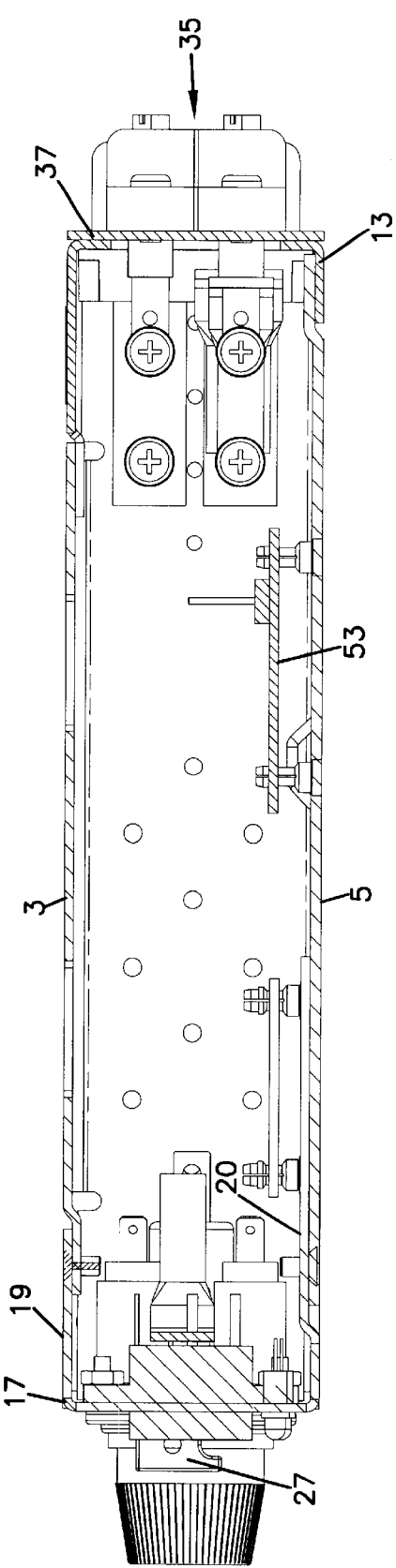

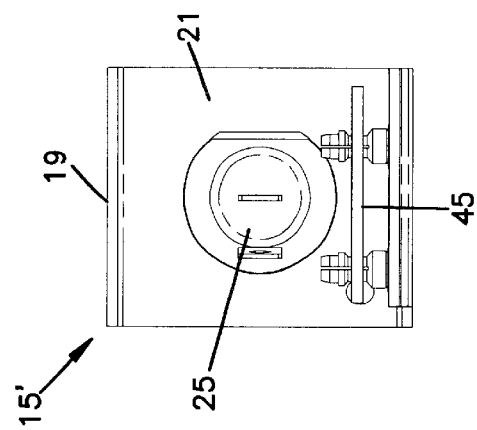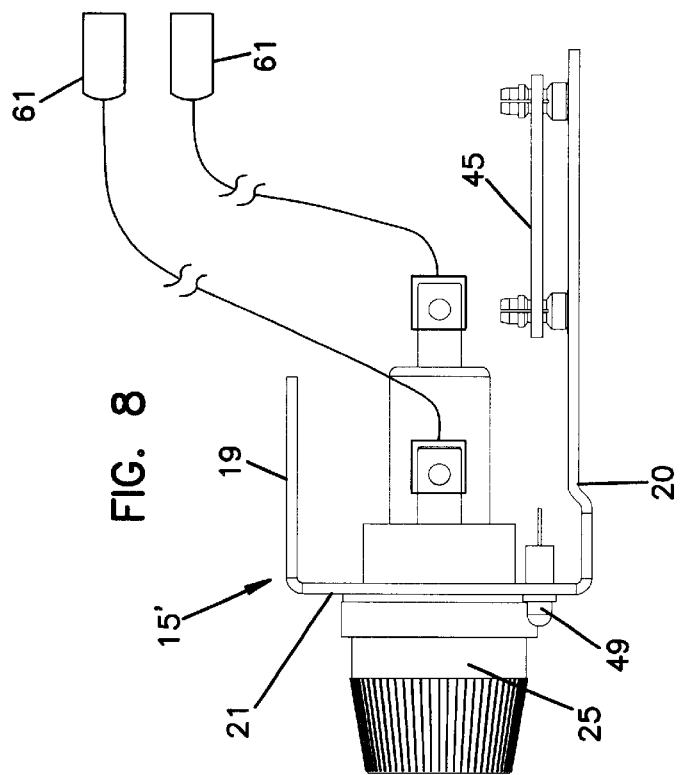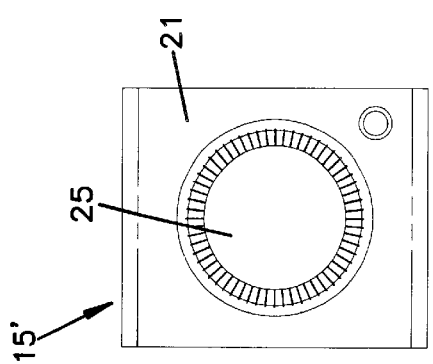

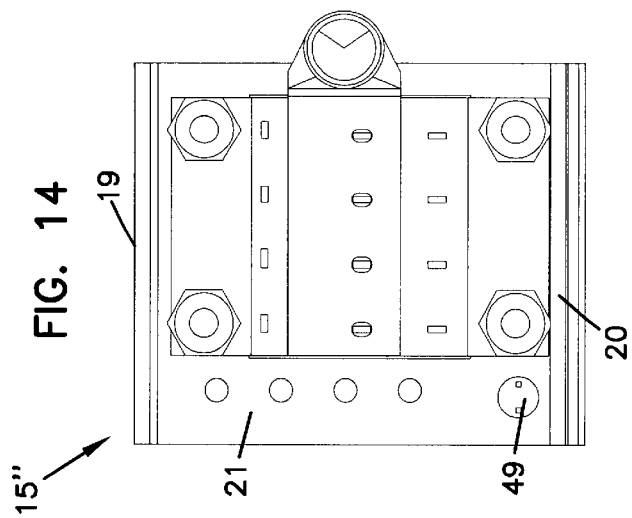
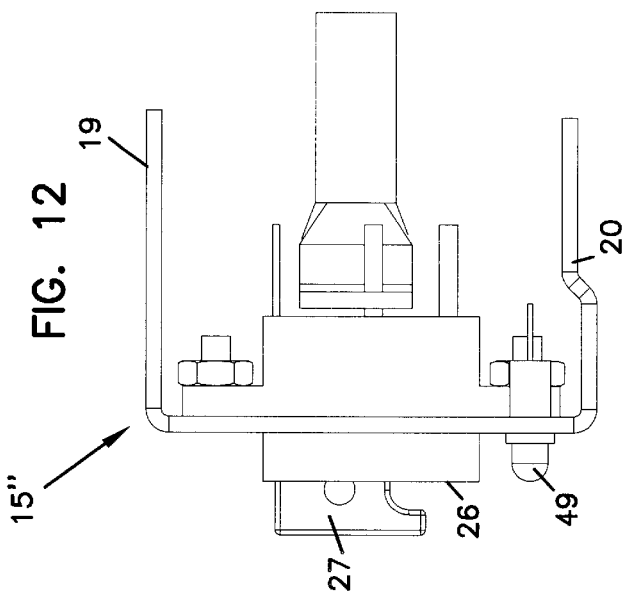
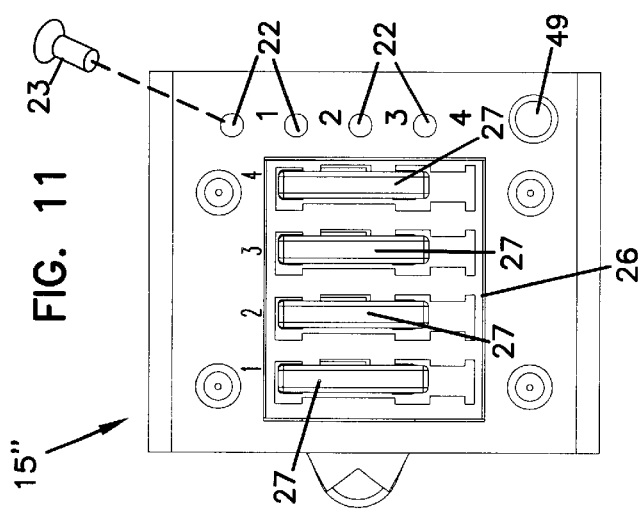

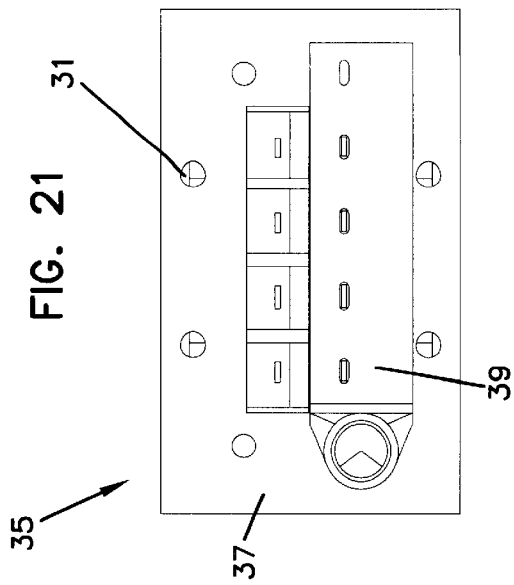
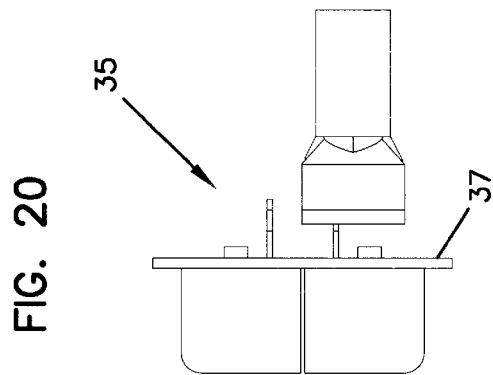
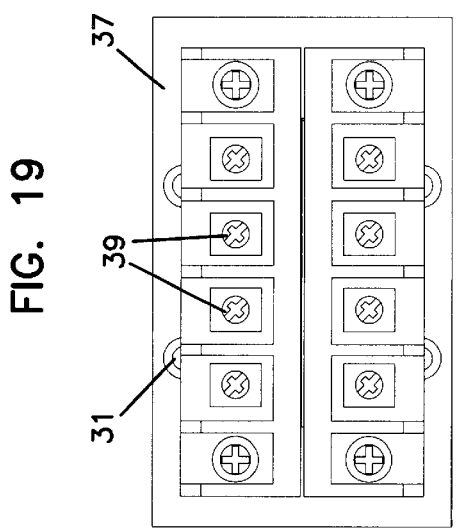

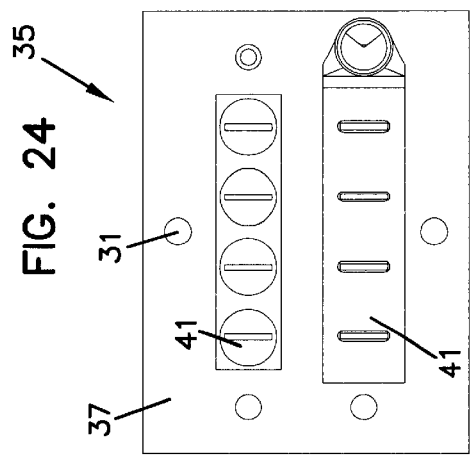
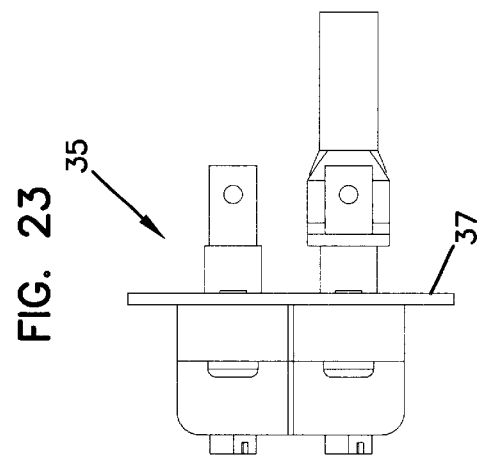
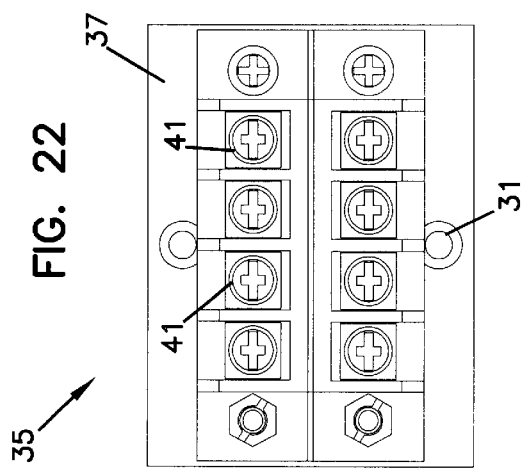

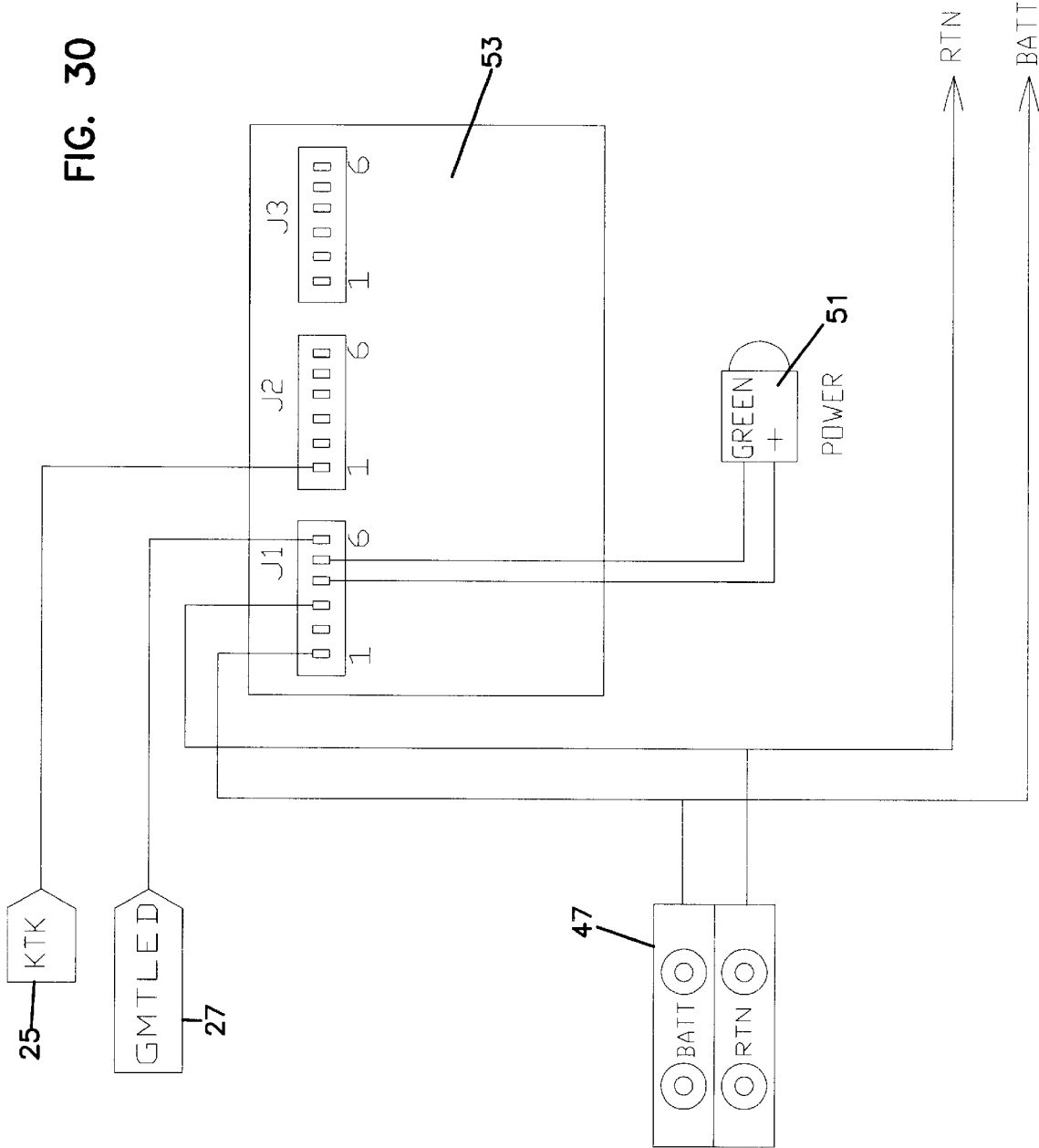

POWER DISTRIBUTION PANEL WITH FLAME CONTAINMENT SLOTS

FIELD OF THE INVENTION

The present invention relates to a power distribution panel.

BACKGROUND OF THE INVENTION

Electrical circuit panels such as power distribution panels typically include a number of different circuit elements such as fuse holders and fuses, circuit breakers, input and output connectors, and alarm signal LEDs. For safety and other reasons, the electrical circuits of power distribution panels are enclosed within a housing structure. Therefore, the circuit elements listed above have typically been inserted into holes which have been pre-cut or pre-punched into the housing structure, usually on a front or back panel of the housing structure. These prior circuit panels are fixed in that once the holes are formed in the housing, the type and arrangement of the components is limited.

In order to manufacture different fixed circuit panels of the prior systems, a circuit panel manufacturer would punch out different patterns of holes in the front or back panels of the housing structure in order to accommodate different arrangements of circuit elements. Significant retooling time and costs are involved for offering different fixed panels. Assembly of the circuit elements is also difficult when the elements are inserted through the holes. There is a need for further circuit panels which allow for more efficient manufacture and use.

In the event that the circuit elements or circuit board contained in a circuit panel catch on fire, it is important that the circuit panel seek to contain the flames within the panel to prevent further spread of the fire. The circuit elements and circuit board, however, must be cooled during normal use to prevent damage due to overheating. There is a need for circuit panels which allow for cooling of the circuit components and which also contain flames in the event of a fire.

SUMMARY OF THE INVENTION

The present invention relates to an improved circuit panel chassis for use with a circuit panel such as a power distribution panel. The chassis has a top, bottom, front and two side surfaces. The top surface defines a plurality of parallel slots. In a preferred embodiment the slots are angled relative to a line perpendicular to the front surface.

In one embodiment the angled slots defined by a first half of the top surface are angled in a first direction. The angled slots on a second half of the top surface are angled in the opposite direction from the line perpendicular to the front and back surfaces as are the angled slots in the first half of the top surface.

In one embodiment the angled slots in the top surface are located in a back half or quarter of the top surface. The back half or quarter of the top surface is the portion of the top surface furthest from the front surface. In an alternative embodiment the angled slots in the top surface are located in a front quarter of the top surface. The front quarter of the top surface is the quarter of the top surface closest to the front surface.

In a preferred embodiment the bottom surface also defines a plurality of angled slots. The angled slots in the bottom surface may be located in a front half or front quarter portion of the bottom surface. The front half or front quarter portion of the bottom surface is that half or quarter of the bottom surface closest the front surface. When configured with a top surface with angled slots in the back half or quarter portion of the top surface, the chassis allows cooling air to flow from beneath the front portion of the chassis through an interior of the chassis where it cools the circuit board or other circuit components and out the back top portion of the chassis. Alternatively the angled slots in the top surface may be located in the front half or quarter of the top surface, and the angled bottom slots may be located in the back half or quarter of the bottom surface.

BRIEF DESCRIPTION OF THE DRAWINGS

FIG. 5 is a cross-sectional side view defined by line A—A in FIG. 2.

FIG. 6 is a cross-sectional side view defined by line B—B in FIG. 2.

FIG. 7 is a front view of one embodiment of a KTK/KLM-type fuse holder module with KTK/KLM-type fuse.

FIG. 8 is a side view of the KTK fuse module of FIG. 7.

FIG. 10 is a rear view of the KTK fuse module of FIG. 7.

FIG. 11 is a front view of one embodiment of a GMT-type fuse holder module with four GMT fuse holder locations and fuses.

FIG. 12 is a side view of the four position GMT fuse module of FIG. 11.

FIG. 14 is a rear view of the four position GMT fuse module of FIG. 11.

FIG. 19 is a front view of a KTK/KLM-type output connector module with KTK output connectors as it would appear if viewing the back of the power distribution panel.

FIG. 20 is a side view of the KTK output connectors of FIG. 19.

FIG. 21 is a rear view of the KTK output connector module of FIG. 19.

FIG. 22 is a front view of a GMT-type output connector module with GMT output connectors as it would appear if viewing the back of the power distribution panel.

FIG. 23 is a side view of the GMT output connector module of FIG. 22.

FIG. 24 is a rear view of the GMT output connector module of FIG. 22.

FIG. 30 is a circuit diagram of an alarm board circuit used in a power distribution panel.

DETAILED DESCRIPTION OF THE PREFERRED EMBODIMENTS

Figure 1:
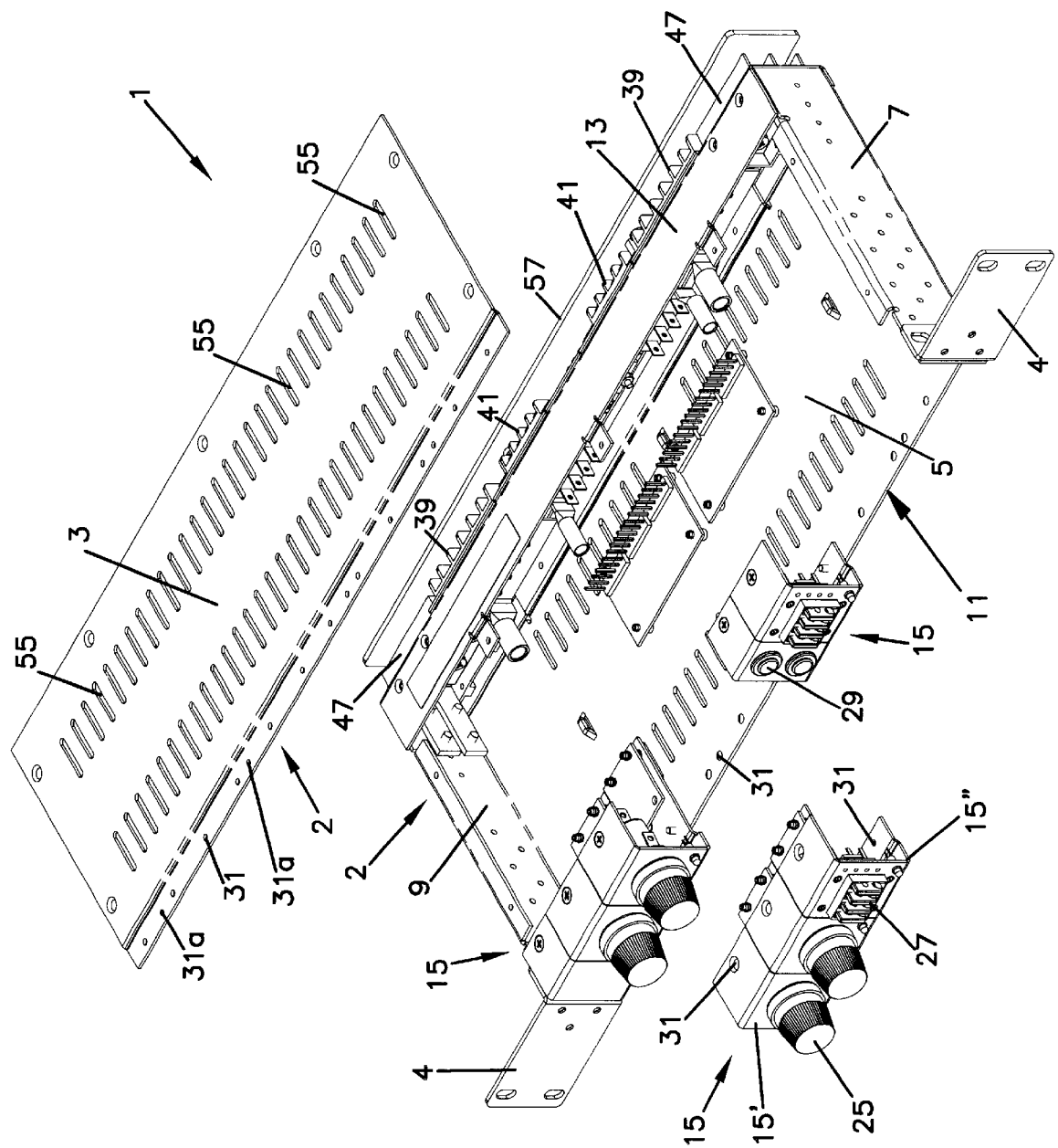
FIG. 1 is an exploded view of one embodiment of a power distribution panel with circuit element modules.
Figure 2:
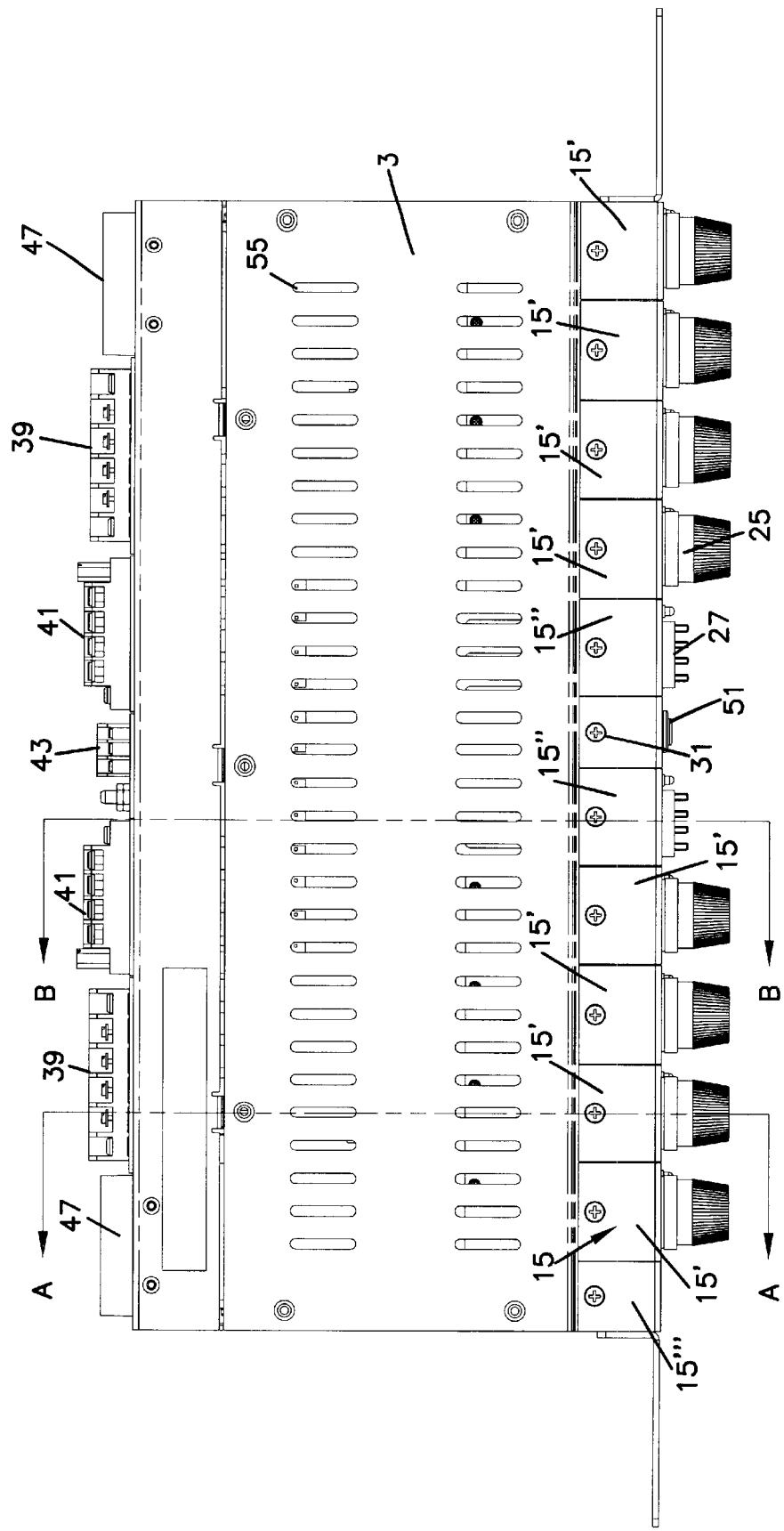
FIG. 2 is a top view of the preferred embodiment of the power distribution panel of FIG. 1.
Figure 3:
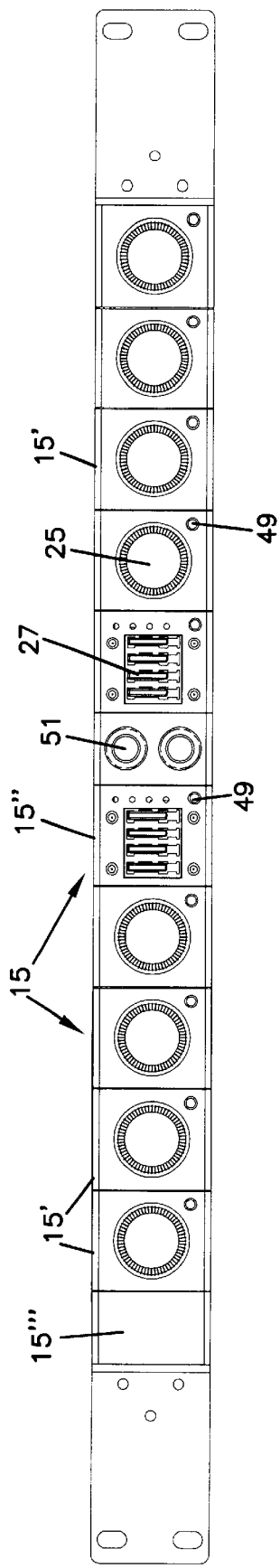
FIG. 3 is a front view of the preferred embodiment of the power distribution panel of FIG. 1.

A power distribution panel is a circuit panel which channels power from a supply line input power to a number of different pieces of equipment. Therefore, a power distribution panel typically has one or more power input connections and an array of output connections to which the pieces of equipment to be supplied with power are connected. The typical power distribution panel also comprises an array of fuse locations, normally one fuse location for each output connection. Alternatively, or in combination, circuit protection may be provided by circuit breakers. This specification and accompanying drawings relate to preferred embodiments of a power distribution panel primarily with fuse modules but it is to be understood that the present invention is applicable to other types of circuit panels using other circuit element modules such as circuit breaker modules, other circuit protection modules, or other circuit element modules with different functions altogether.

As shown in the preferred embodiment of FIGS. 1–31, a power distribution panel 1 is shown having a unit housing 2 with a top panel 3, a bottom panel 5, and two side panels 7 and 9. The top, bottom and two side panels define a front end 11 of the unit housing 2. The unit housing 2 also includes a back panel or portion 13. The back portion 13 is coupled to the top and bottom panels 3 and 5 of the unit housing to form a back end of the unit housing. In one embodiment, the unit housing 2 is made of sheet metal or molded plastic. Mounting brackets 4 are provided along the side for mounting panel 1 to a rack, frame or other equipment supporting structure.

The panel 1 presents a configurable housing or chassis that allows use of the common chassis with various modular components that define the circuit functionality of the panel. The preferred panel 1 includes modular constructions for the fuse or other circuit protection components, and modular constructions for the power output connectors, status and alarm indicators, and alarm signal connectors.

Figure 32:
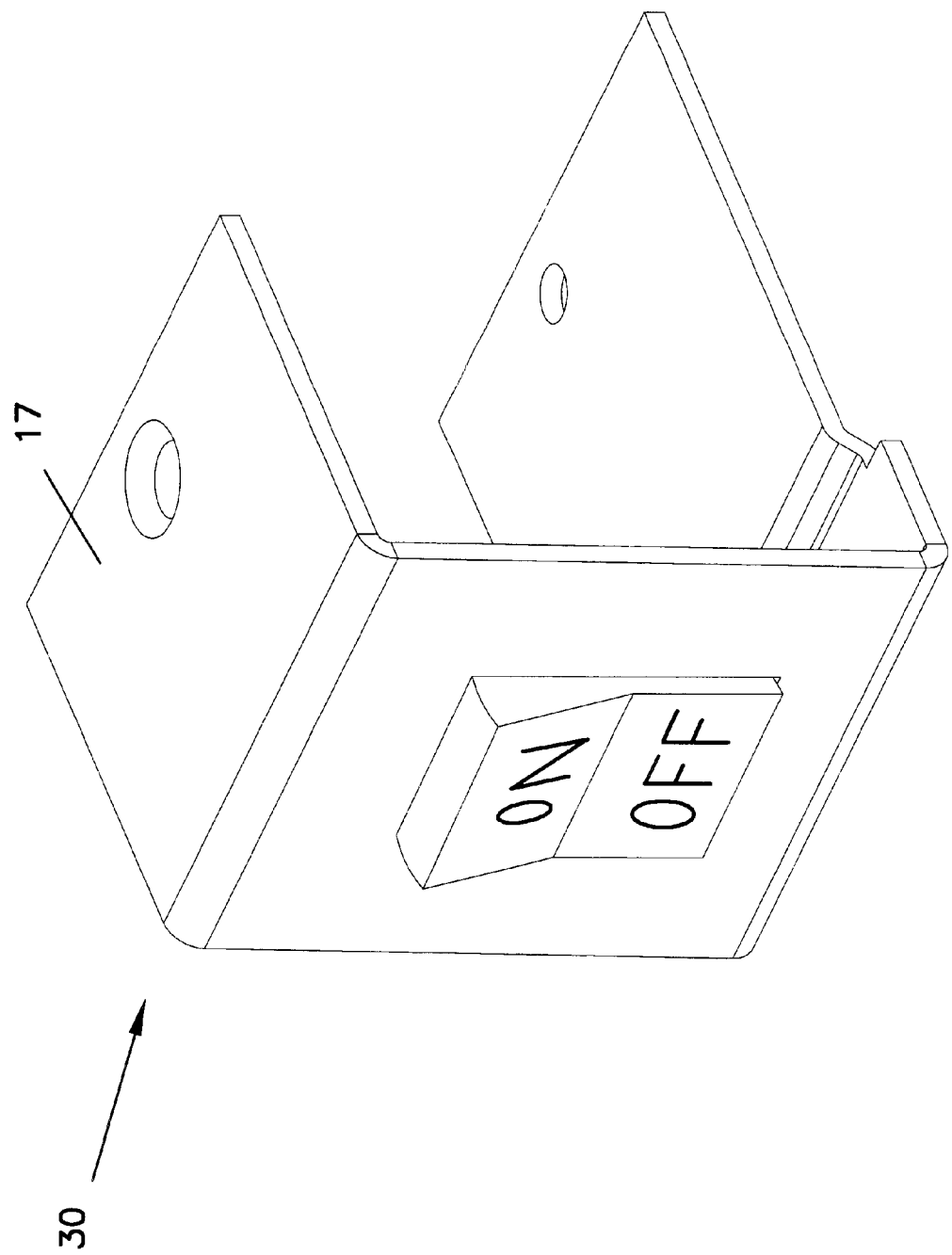
FIG. 32 is a circuit breaker module.

The circuit element modules 15 are coupled onto the front end 11 of the panel 1. Each circuit element module 15 preferably includes a circuit element mounted onto a generally C-shaped module member 17 having upper and lower flange surfaces 19 and 20 which are connected by a middle front surface 21. The circuit element 15 may be, for example, a KTK/KLM-type fuse holder location 24 for a KTK fuse 25 as shown in FIGS. 7–10, an array of GMT-type fuse holder locations 26 for GMT fuses 27 as shown in FIGS. 11–14, a power on indicator LED 29 as shown in FIGS. 15–18, a circuit breaker 30 as shown in FIG. 32, TPS-type fuses, or TPA-type fuses, or any other circuit protector element or other circuit element.

The module members 17 are configured to fit the front end of the unit housing. The module members 17 may be made from bent and cut sheet metal, or from plastic. The module members 17 are made in standardized sizes and shapes, allowing assembly of the fuse panel to easily and efficiently vary a product line or customize the configuration in a particular manner. The manufacturer or the customer may choose the number and type of fuses, circuit breakers, and other circuit elements desired up to the capacity of the power distribution panel which is governed by the width and height of the panel. In some applications, the circuit elements in the power distribution panel can be changed as the user's needs change or as elements need replacement or upgrading.

As shown in FIGS. 5 and 6, the top panel 3 may be recessed at recess 28 to receive the upper flange surfaces 19 of the module members 17, presenting a generally planar top surface of the panel 1. In a similar manner, the lower flange surfaces 20 of the module members 17 may be recessed at recess 32 to receive the bottom panel 5, presenting a generally planar bottom surface of the panel 1.

The top panel 3 and the upper flange surfaces 19 of the module members 17 define fastener holes or perforations 31 for coupling the circuit element modules 15 to the panel 1. Additionally, the bottom panel 5 and the lower flange surfaces 20 of the module members 17 may define fastener perforations 31. Due to the C-shaped configuration of the module members the circuit element modules are coupled to the panel 1 without devoting space on the middle front surfaces 21 of the module members 17 to fastener perforations and fasteners. By placing the fasteners and fastener perforations 31 on upper and lower flange surfaces 19 and 20 and not on the middle front surface 21, more circuit element modules 15 may be fitted into the same size panel. Fastener perforations 31 on top and bottom panels 3, 5 are positioned in desired patterns, preferably repeating or equally spaced patterns to facilitate increased versatility of panel 1. The repeating patterns may be sequential, or mirror images. Some perforations may not be used for each panel 1, depending on the length of the modules.

Figure 17:
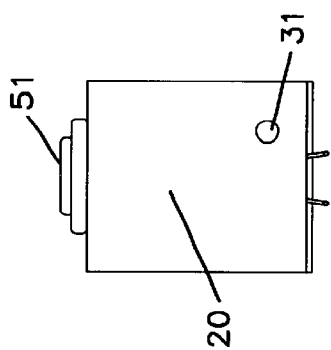
FIG. 17 is a bottom view of the power on LED indicator module of FIG. 15.
Figure 9:
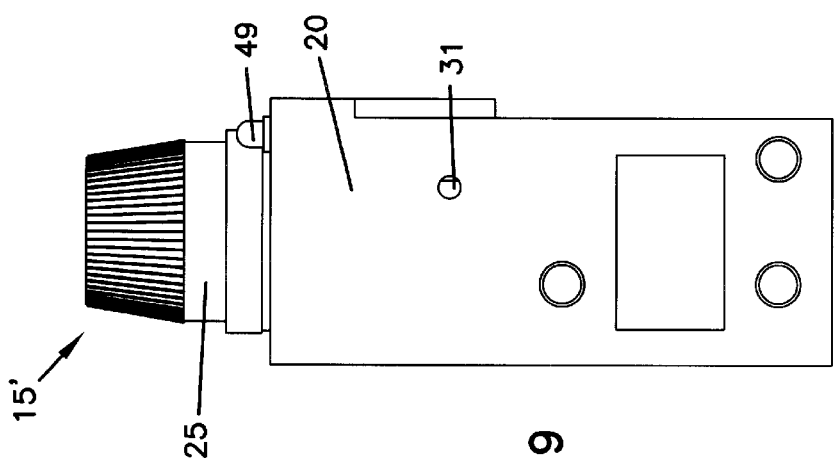
FIG. 9 is a bottom view of the KTK fuse module of FIG. 7.
Figure 13:
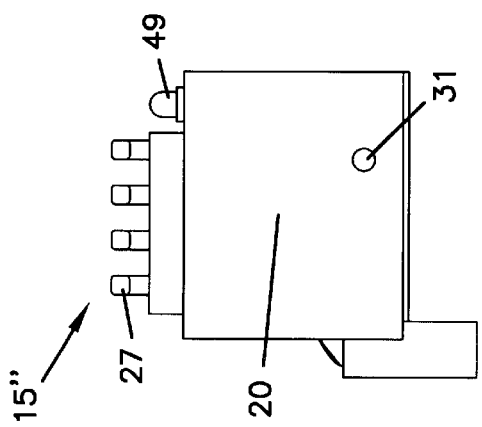
FIG. 13 is a bottom view of the four position GMT fuse module of FIG. 11.
Figure 18:
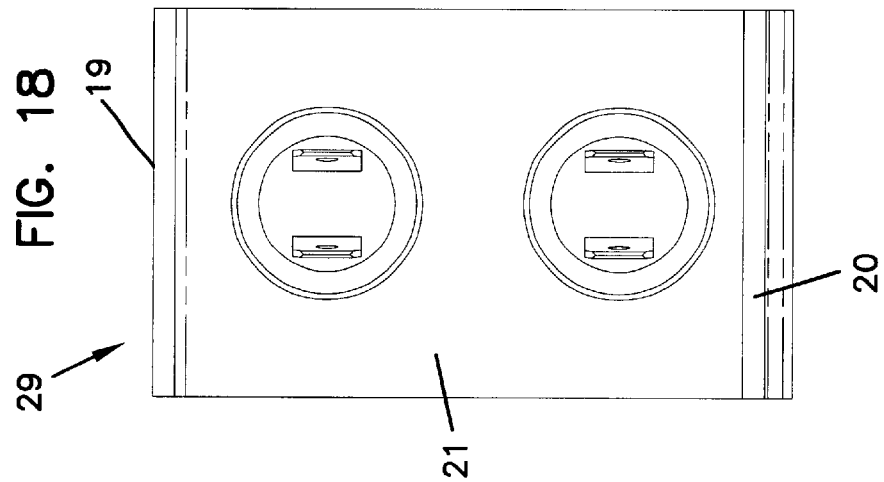
FIG. 18 is a rear view of the power on LED indicator module of FIG. 15.
Figure 16:
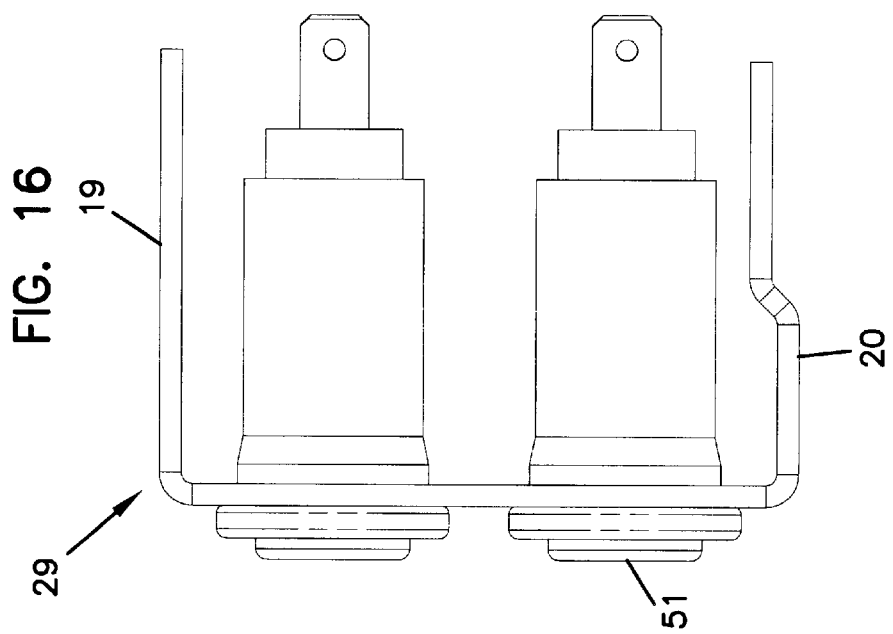
FIG. 16 is a side view of the power on LED indicator module of FIG. 15.
Figure 15:
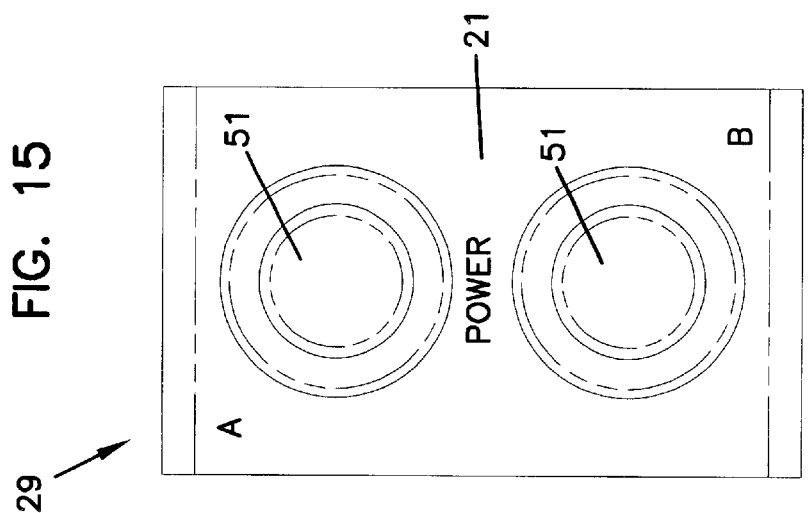
FIG. 15 is a front view of one embodiment of a power on LED indicator module.

The fastener perforations 31 in the upper and lower flange surfaces 19, 20 of the module members 17 are positioned not to have their axes concentric. If the single fastener perforations 31 were along concentric axes, the circuit element modules would tend to pivot around an axis defined by the fastener perforations. By positioning the fastener perforations 31 on the upper and lower flange surfaces 19 and 20 on separate vertical axes, the circuit element modules 15 are more stable and will not pivot. By more securely mounting the modules to limit rotation, a safer module and panel results since moveable modules may present electrical hazards. In FIGS. 9, 13 and 17 it can be seen that the fastener perforations 31 are off-center and therefore not aligned co-axially with the fastener perforations on the upper flange surface 19. The fastener perforation 31 in the lower flange surface 20 of the module members 17 may alternatively be sized to fit over a positioning peg disposed on the bottom panel 5 of the unit housing to prevent the modules from pivoting.

Each circuit element module 15 is sized in width to be a multiple of some unit length. For example, if the unit length were 1.5 inches, the circuit element modules could be 1.5, 3, 4.5, 6, or 7.5 inches wide or wider, up to a maximum width of the panel. A circuit element module that is 3 inches wide may be replaced by two circuit element modules that are each 1.5 inches wide. Therefore, although the GMT fuse modules shown in FIGS. 1 and 11–14, have arrays of four GMT fuse holder locations positioned on module members 1.5 inches wide, it is to be understood that larger arrays of fuse holders such as 10 fuse holder arrays could be used with the present invention simply by placing the larger arrays on module members that are, in the preferred embodiment, multiples of 1.5 inches wide, for example, 3 or 4.5 inches wide. As an alternative, the unit length may be 0.5 inches, and the modules may be multiples of 0.5 inches, with no module actually 0.5 inches in length.

Figure 4:
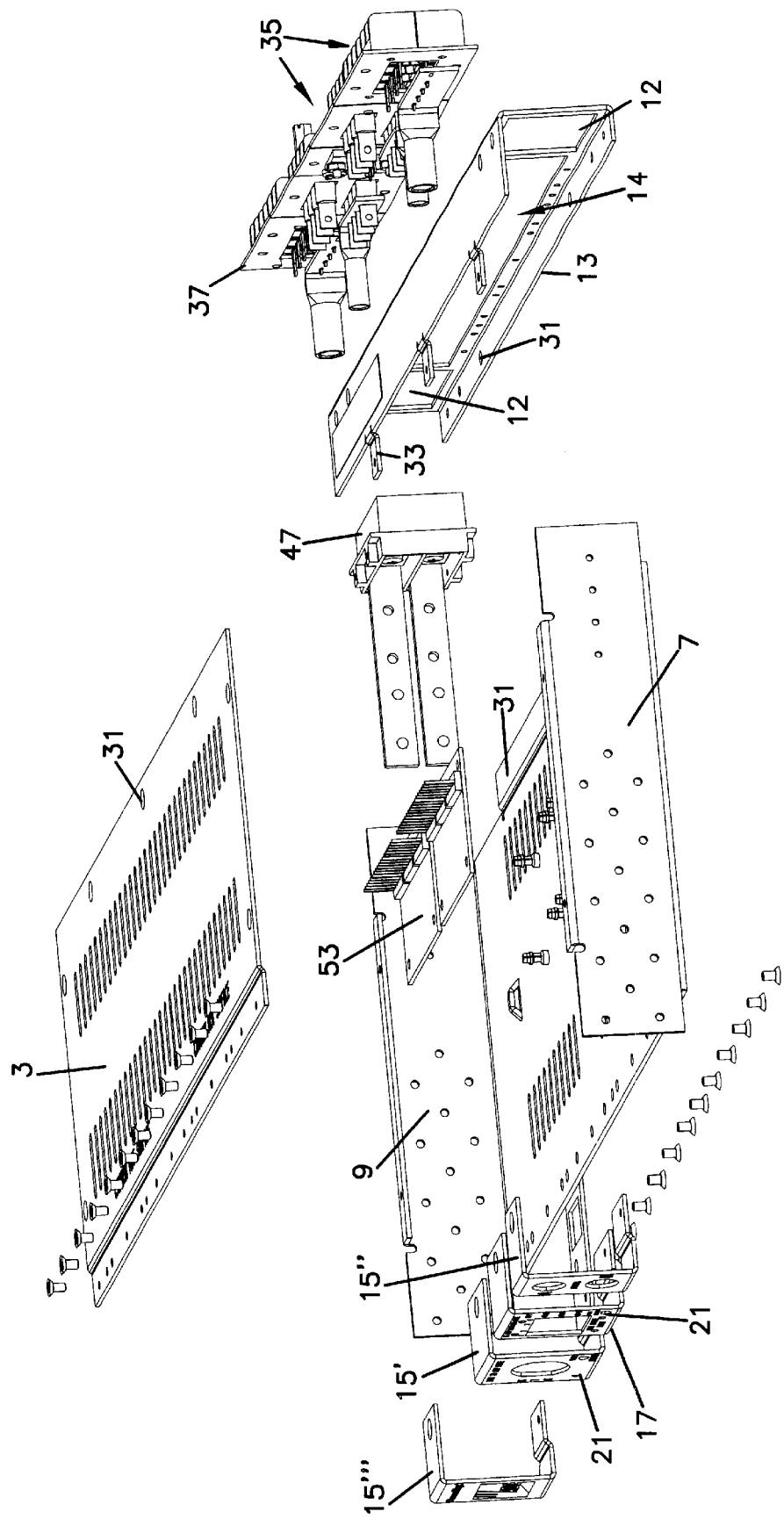
FIG. 4 is a further exploded view of the power distribution panel of FIG. 1.

Referring now to FIG. 4, the back portion 13 is coupled to the top panel 3 by fastener tabs 33 which may be recessed underneath the top panel 3, presenting a generally planar top surface of the panel 1 (see FIGS. 5 and 6). The fastener tabs 33 and top panel define fastener perforations 31 for coupling the back portion 13 to the top panel 3. The bottom panel is also coupled to the back portion 13. The bottom panel 5 may be recessed to receive the back portion 13, presenting a generally planar bottom surface of the panel 1 (see FIGS. 5 and 6).

Figure 27:
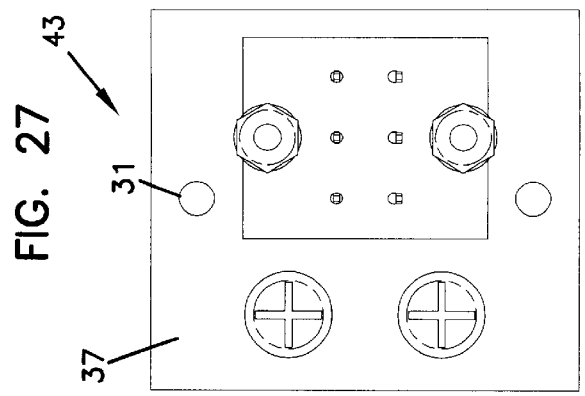
FIG. 27 is a rear view of the alarm output module of FIG. 25.
Figure 26:
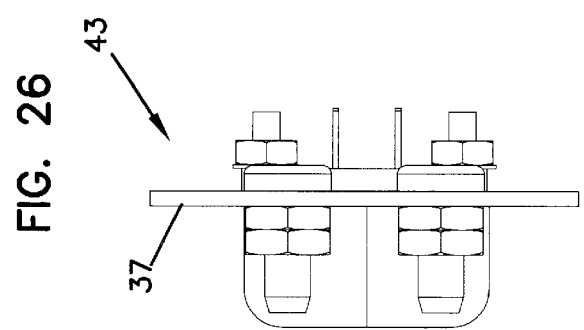
FIG. 26 is a side view of the alarm output module of FIG. 25.
Figure 25:
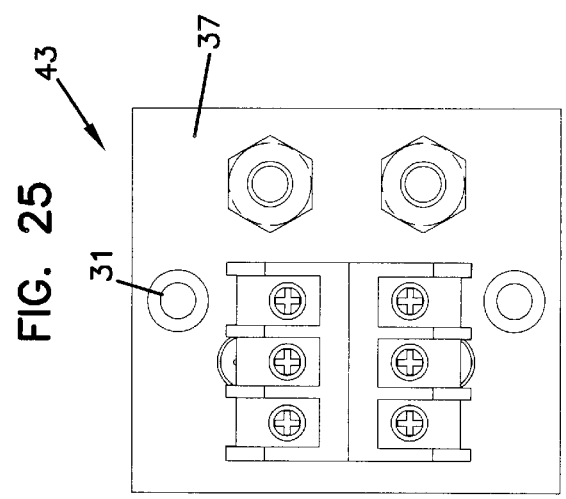
FIG. 25 is a front view of an alarm output module as it would appear if viewing the back of the power distribution panel.
Figure 28A:
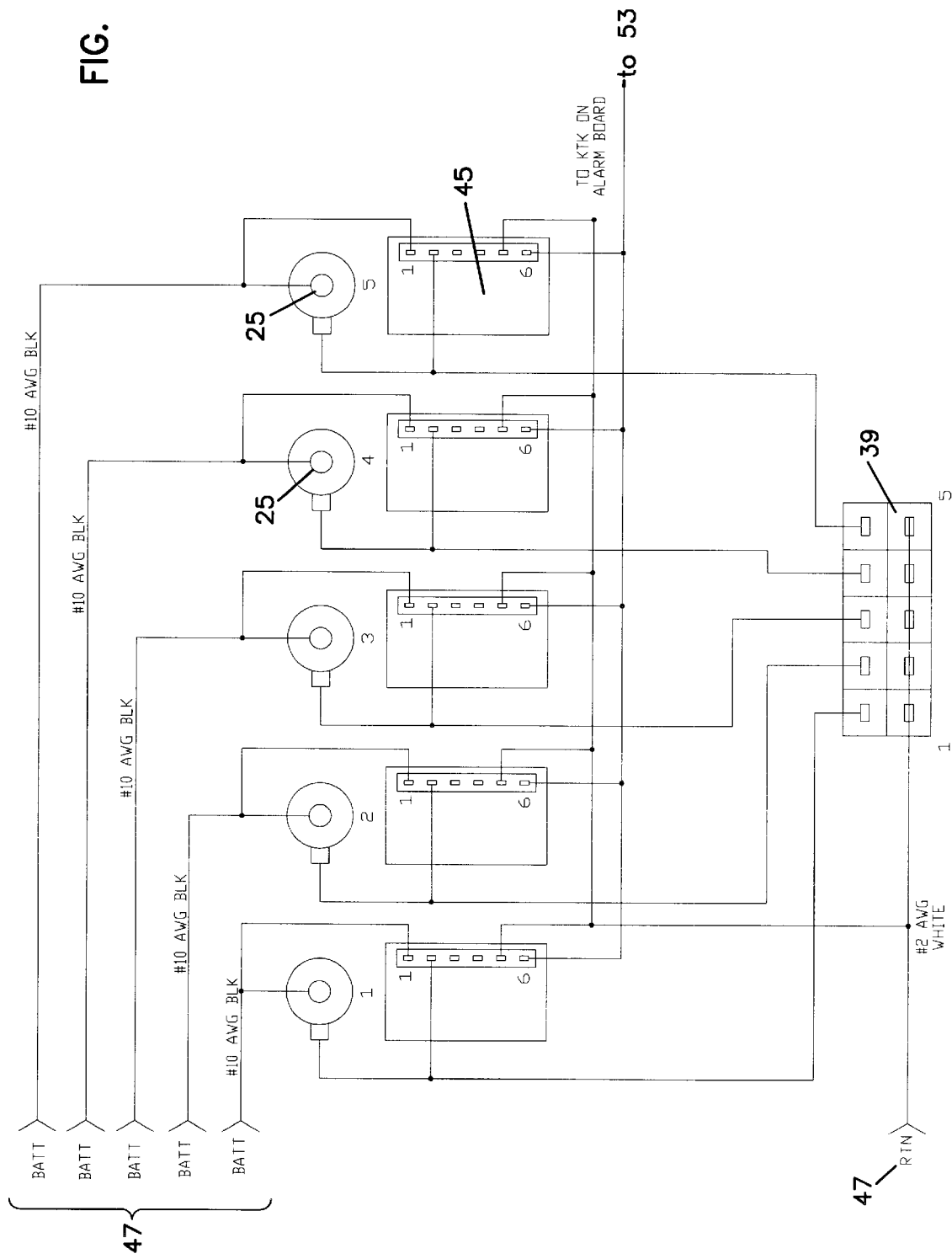
FIGS. 28A and B are circuit diagrams of a circuit used in a power distribution panel with KTK fuses.
Figure 33:
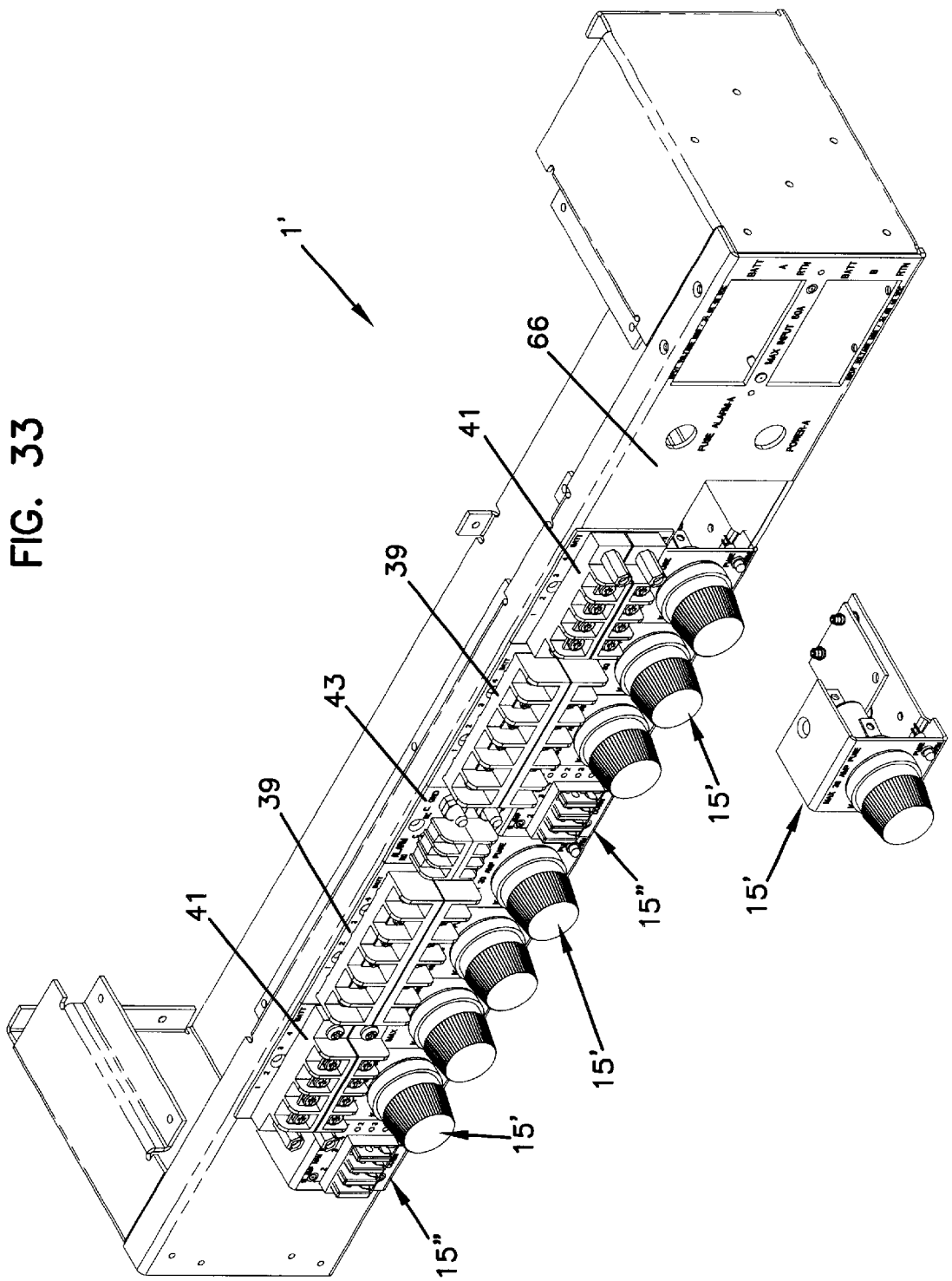
FIG. 33 is one preferred embodiment of a total front access power distribution panel.

Not only are the circuit elements modularized, but power input and output connectors may also be modularized. Typically, the power input and output connectors are placed in the back portion 13 of the panel as shown in FIG. 1, but they may also be placed at the front end as shown in FIG. 33. The input and output connectors may be modularized into connector modules 35 by placing arrays of connector locations onto module plates 37. The module plates 37 and connector arrays are configured to fit a window 14 formed in the back portion 13. The output connector arrays may be, for example, KTK/KLM-type output connectors 39 as shown in FIGS. 19–21, or GMT-type output connectors 41 as shown in FIGS. 22–24. The module plates may be L-shaped, C-shaped or other as desired for mounting to the panel 1. The output connectors 39 and 41 may be screwdown barrier terminal strip type connectors or a set-screw barrel terminal strip or even ring terminals, or other connector types. An alarm output connector module 43 may also be included as shown in FIGS. 25–27. The alarm output connectors 43 may be connected to remote devices to signal when a power or fuse (or other circuit protection element) failure has occurred.

The back portion 13 is also configured with power input windows 12 to receive power input connectors 47. The power input connectors 47 are configured to accept electrical power supply lines. The power input connectors 47 may be configured as two hole compression lug-stud type connections or set screw barrel connections or other connectors known in the art. A protective rear panel 57 is used as a safety precaution to cover the power input connectors 47 and the output connectors 39, 41 and 43.

FIGS. 7–10 show a KTK/KLM-type fuse holder module 15'. The lower flange surface 20 is extended to accommodate a fuse alarm board 45 which may be configured to connect the KTK/KLM-type fuse 25 and an alarm LED 49. FIGS. 11–14 show a GMT fuse holder module 15" also configured with an alarm LED. GMT module 15" includes designation pin holders 22 in a vertical line for holding a designation pin (peg) 23 for each fuse holder to provide indicia as to the fuse type inserted into the fuse holder location. A preferred location for LED's 49 is along a lower portion of panel 1. Such a feature is advantageous because panel 1 is typically located higher in the rack, so viewing of lower LED's 49 is more convenient to the user. FIGS. 15–18 show a power on LED module 29 for signaling when the panel is receiving power. The panel may be configured as shown in FIG. 31 to receive dual power inputs, therefore the power on LED module shown in FIGS. 15–18 may include a power on indicator LED 51 for each power input.

The modules 15' and 15" are generally C-shaped members which define a circuit holder in front section 21. Front section 21 is formed to include a hole for receipt of the desired fuse holder or other circuit element to be mounted thereto by fasteners or other mounting mechanisms. A blank module 15''' is shown in panel 1 at the left end. LED module 29 and blank module 15''' are also C-shaped.

Figure 29:
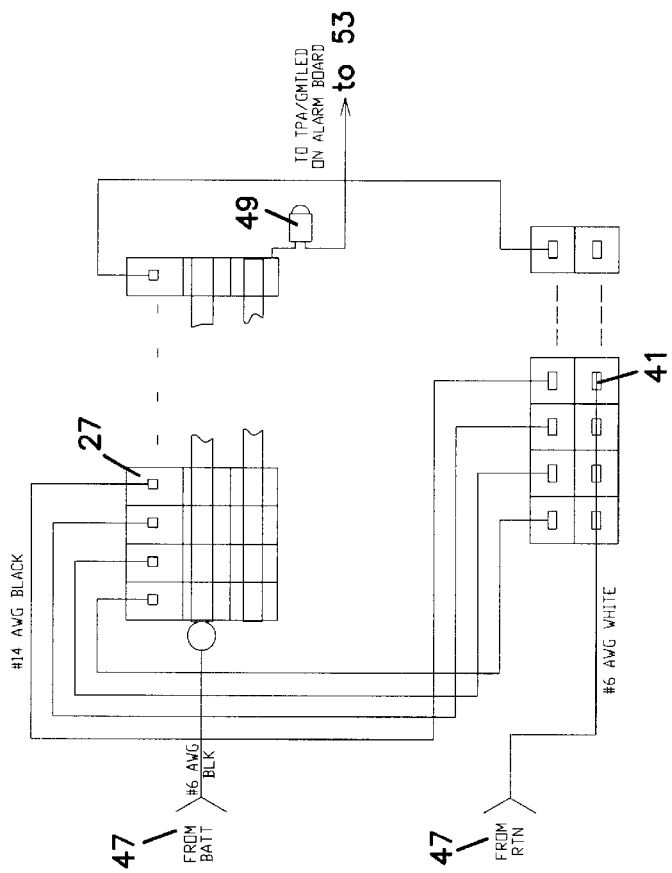
FIG. 29 is a circuit diagram of a circuit used in a power distribution panel with GMT fuses.
Figure 28B:
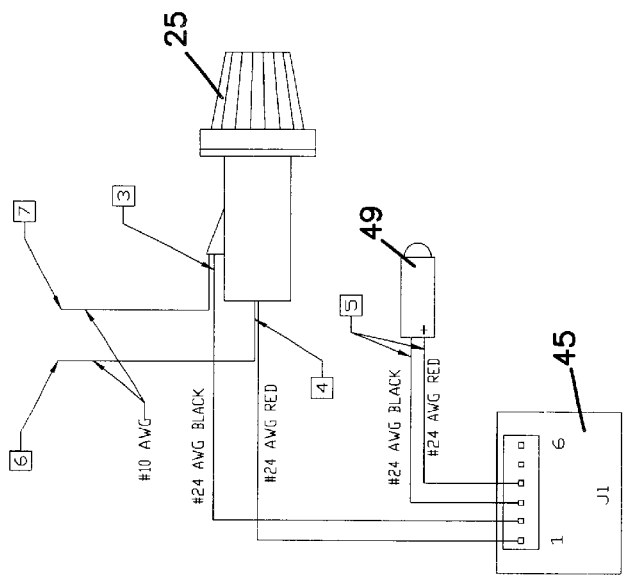
Figure 31:
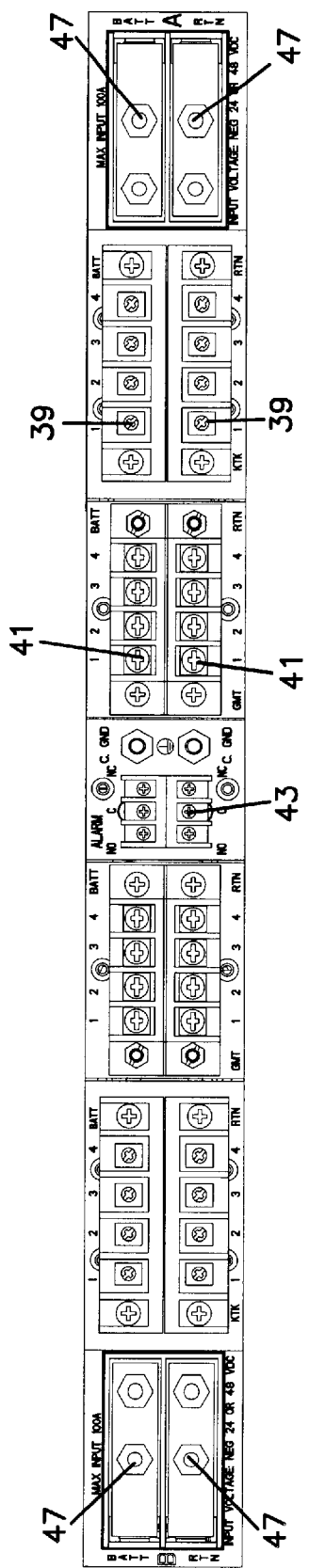
FIG. 31 is a rear view of the preferred embodiment of the power distribution panel of FIG. 1 with the protective panel removed.

The power input connectors 47 shown in FIG. 31 are connected to the fuses of the circuit element modules 15 and thereby to the power output connectors by means of an electrical circuit. The circuit will vary depending on the configuration of the circuit element modules 15 and the output connector modules 35 selected and may include a panel alarm board 53. The preferred circuit links the power input to the power output connectors through the fuse or other circuit protecting components. The preferred circuit also provides alarm and status signals to the user, such as "power on," and "fuse blown." FIGS. 28A and B show a typical electrical circuit for connecting an array of KTK fuses to the power input connectors 47, the KTK alarm boards 45, and KTK output connectors 39. FIG. 29 shows a typical electrical circuit for connecting an array of GMT fuses to the power input connectors 47, the GMT output connectors 41, the alarm LED 49 on the GMT module, and the panel alarm board 53. FIG. 30 shows a typical electrical circuit connecting the alarm board 53 to the power input connections 47 and power on indicator LED 51.

A manufacturer of a circuit panel according to the present invention may also manufacture and supply to the panel user, circuit element modules 15 which have been pre-wired for installation. Pre-wired modules also simplify assembly by the manufacturer. Circuit element modules 15 can be electrically connected to appropriate wires with connectorized ends by the manufacturer, to facilitate easy assembly. See for example leads 61 in FIG. 8.

As described above the power distribution panel is modularized both in that the circuit elements such as fuses and circuit breakers are modularized, and in that the output connectors are modularized. As shown in FIG. 33, a total front access power distribution panel 1' can be constructed according to the present invention which would provide for modular circuit elements 15' and 15" as well as output connectors 39 and 41 and alarm connectors 43 on the front. An appropriately configured front housing 66 includes structure for attaching to each of the modules, whether they are C-shaped or planar shaped.

Although not required, in the preferred embodiment it should be noted that the blanks 15''' are shorter in length than modules 15' 15". Blanks 15''' are equal in length to LED module 29. If longer modules 15 are used, multiple fasteners may be employed, such as through holes 31a in the case of a 3 unit fuse module. Holes 31a are not used in the illustrated panel 1 with the various illustrated modules 15,29.

The circuit panel may include ventilation slots 55 in the top panel 3 of the unit housing 2, and ventilation slots 59 in the bottom panel 5. The slots 55, 59 are linear slots extending in two rows across the top and bottom panels. The slots 55, 59 may allow adequate ventilation, but mat not allow for sufficient flame containment for an internal fire. As described below the ventilation slots may be configured in an alternative manner so that if the circuit components inside the panel ignite, any resulting flames may be better contained inside the panel. Further, alternatively or in combination the top panel may comprise a heat sink, such as described in U.S. application Ser. No. 09/527,897, filed Mar. 20, 2000, and the disclosure of which is hereby incorporated by reference.

The panel 1 described above includes a configurable front end, and possibly a configurable back end for the various circuit modules, alarm/signal modules, and the connector modules for configuring the panel to have the desired functions. Such a construction allows for efficient inventory management, and more timely delivery of varied panels to customers. For example, the user can specify one or more of the following: front/rear access; input power connector type; fuse/circuit breaker types and numbers, output power connector type(s); alarm signal connector type(s); and the alarm signal type(s). By maintaining one or more styles of chassis, and an inventory of components, the different panels can be conveniently assembled.

If the circuit components such as the circuit board of a circuit panel catch on fire, it is important to contain the flame within the panel to prevent further spread of the fire. Of course, if the circuit panel chassis includes no holes or slots, the flame will be contained within the panel. However, holes or slots in the circuit panel chassis are beneficial for allowing airflow through the panel to cool the circuit components of the circuit panel during normal use. It has been discovered that the cooling holes or slots, if configured according to the present invention, will improve flame containment while at the same time providing effective airflow and cooling action to the circuit components during normal use. These slots also allow venting of hot air created by equipment located below the panel when installed, for example, in a vertically stacked rack of circuit panels. In such a case, the slots prevent the circuit panel from becoming a barrier to the upward flow of heat.

Figure 34:
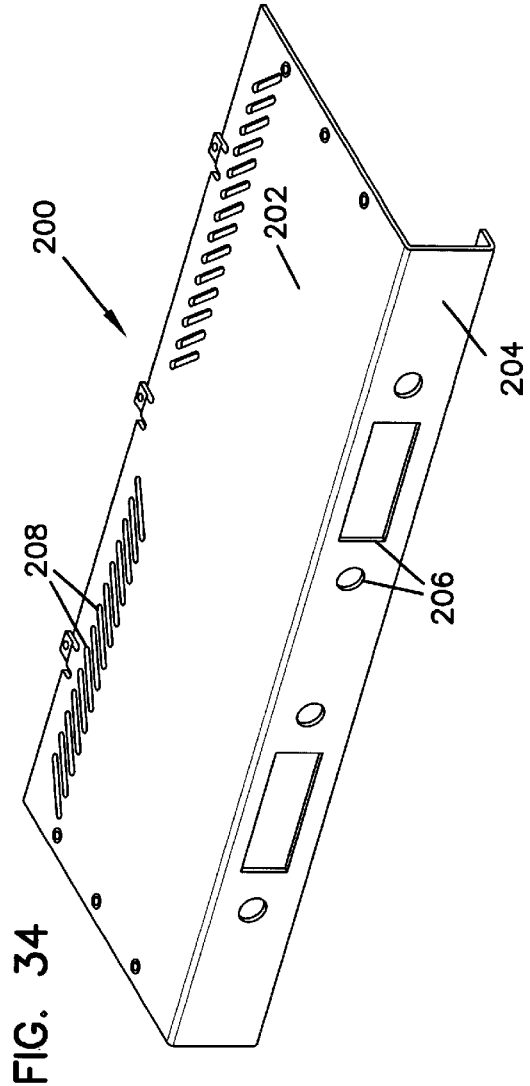
FIG. 34 is a perspective view of a portion of a fuse panel chassis including a top and front surface, the top surface includes flame containing slots according to the present invention.
Figure 35:
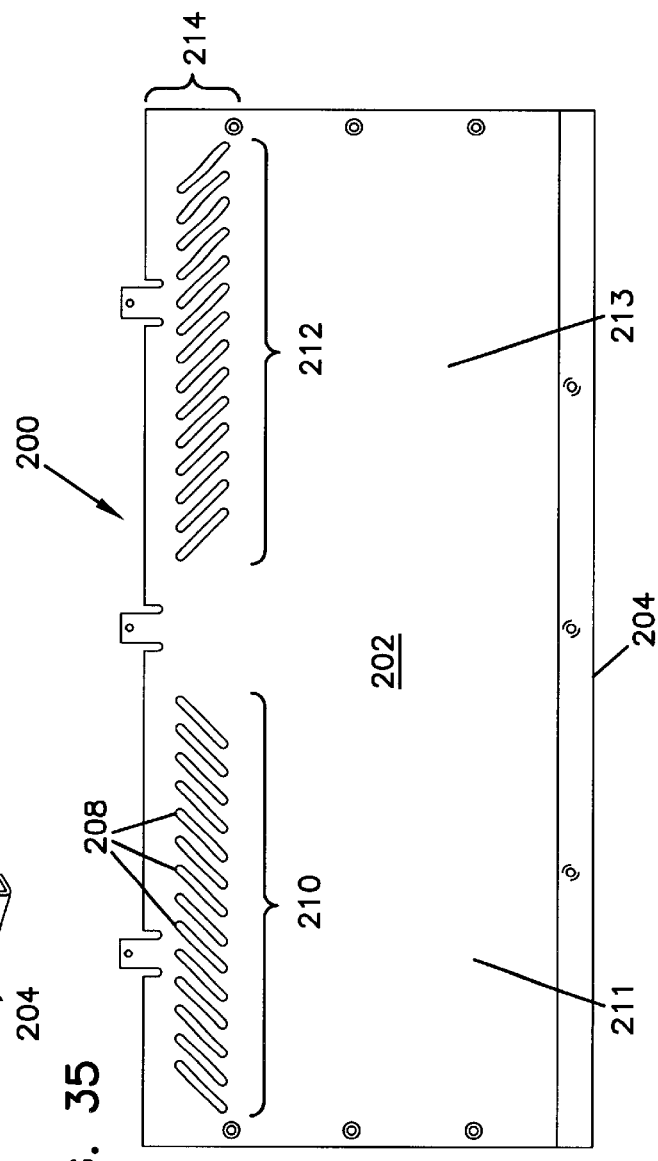
FIG. 35 is a bottom view of the portion of a circuit panel chassis of FIG. 34

FIGS. 34–38 illustrate a configuration of cooling slots which achieve improved flame containment. FIGS. 34 and 35 show a top piece 200 of a circuit panel chassis. The top piece 200 includes a top surface 202 and a front surface 204. The front surface defines a series of holes 206 for receiving circuit panel components such as fuses. The top surface 202 defines a plurality of parallel, angled slots 208. Slots 208 are shaped as linear openings. The angled slots 208 are positioned at an angle relative to a line perpendicular to the front surface. A circuit panel chassis configured with a top surface 202 defining angled slots 208 aids in preventing the flames from escaping the circuit panel if the circuit board or other components catch on fire.

The angled slots in the top surface may be divided into two groups. The group of slots 210 on one half 211 of the top surface 202 are at a first angle relative to a line perpendicular to the front surface. A second group of slots 212 on an opposite half 213 of the top surface 202 are at a second angle relative to the line perpendicular to the front surface. The second angle has the same magnitude as the first angle but in the opposite direction.

The angled slots are located in a back half, preferably in a back quarter portion 214 of the top surface 202. The back quarter portion 214 of the top surface 202 is the portion of the top surface 202 furthest from the front surface 204.

Figure 36:
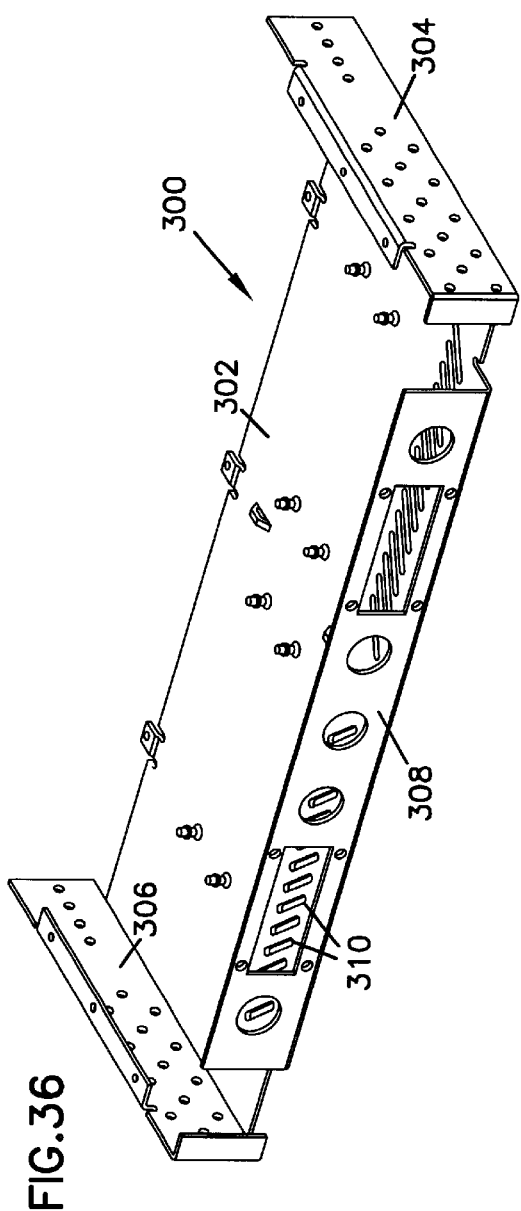
FIG. 36 is a perspective view of a portion of a circuit panel chassis including a bottom surface, a front surface, and two side surfaces, the bottom surface defining flame containing bottom slots according to the present invention.
Figure 37:
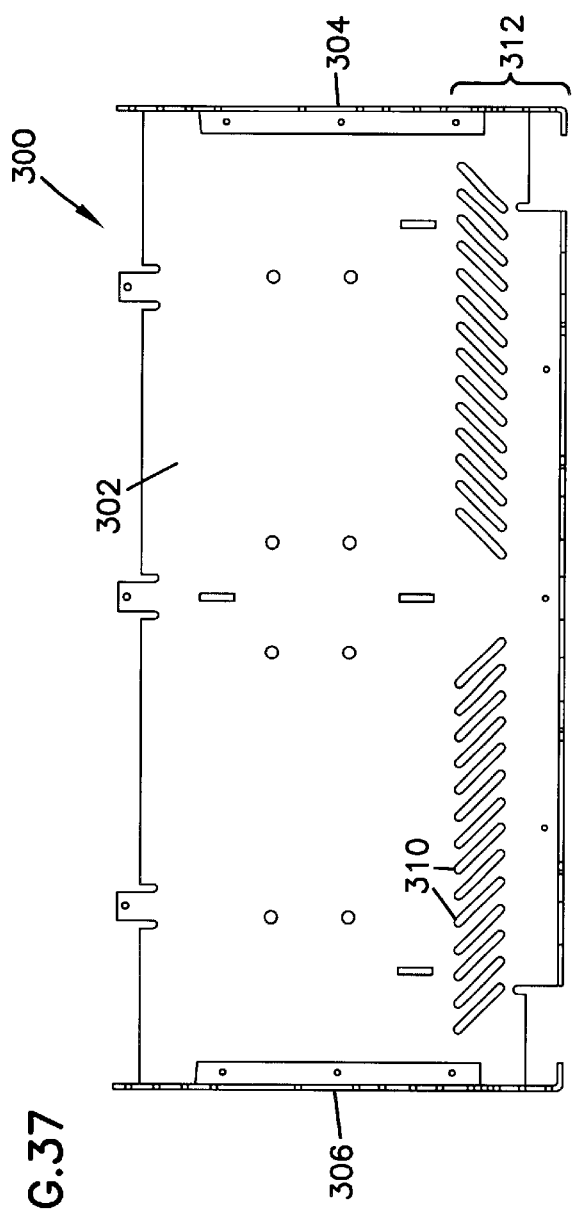
FIG. 37 is a top view of the portion of a circuit panel chassis of FIG. 36.

FIGS. 36–37 show a bottom piece 300 of a circuit panel chassis. The bottom piece 300 includes a bottom surface 302, two side surfaces 304 and 306 and a front surface 308. The bottom surface 302 defines a plurality of angled bottom slots 310. The angled bottom slots 310 are similar to the angled slots 208 defined by the top surface 202 in FIG. 35. The angled bottom slots 310, however, are located in a front half, preferably in a front quarter portion 312 of the bottom surface 302. The fronts of pieces 200 and 300 can be configured as desired, such as for receipt of individual components or modular components as in FIGS. 1–33. Pieces 200 and 300 allow for attachment of a rear piece (not shown in FIGS. 34–37) to enclose an interior area of the panel. The rear piece may be constructed in a similar manner as for the devices of FIGS. 1–33.

Figure 38:
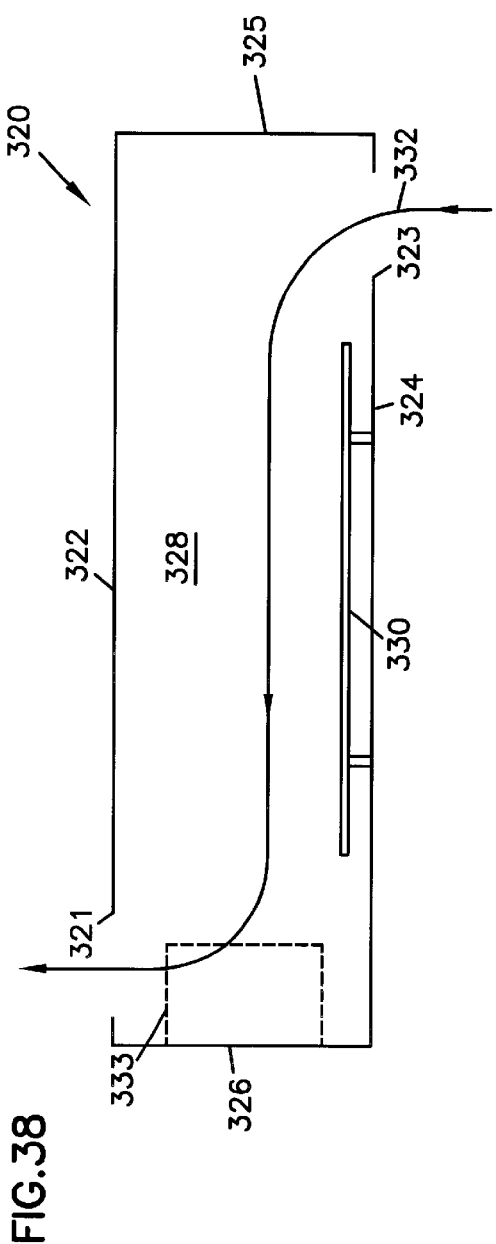
FIG. 38 is a schematic side cross-section of a circuit panel showing the flow path of cooling air through the flame containing slots of the top and bottom surfaces.

By combining into one chassis a top surface as shown in FIG. 35 with a bottom surface as shown in FIG. 37, a cooling air flow pattern as shown in FIG. 38 can be achieved. FIG. 38 shows a circuit panel chassis 320 configured with a top surface 322, a bottom surface 324, a front surface 325, a back surface 326 and two side surfaces (not shown in FIG. 38). These six surfaces define a circuit panel interior 328. An electrical circuit such as circuit board 330 is housed in the interior 328 of the circuit panel chassis. The front and back surfaces 325 and 326 may include one or more holes or openings for receiving connection locations or circuit components. For example, the front surface could comprise modular components as described above. The top surface 322 defines angled slots 321. The bottom surface defines angled bottom slots 323.

In FIG. 38, arrow 332 shows a flow path of air during operation of the circuit panel. The air enters the interior of the panel through bottom slots 323 passes through the interior 328 where it cools the circuit board 330 and rear components 333 and then exits the interior 328 through angled slots 321. The depicted airflow path also allows for heated air produced by other equipment in the rack or frame to pass upwardly through panel chassis 320 and away from the equipment.

Figure 39:
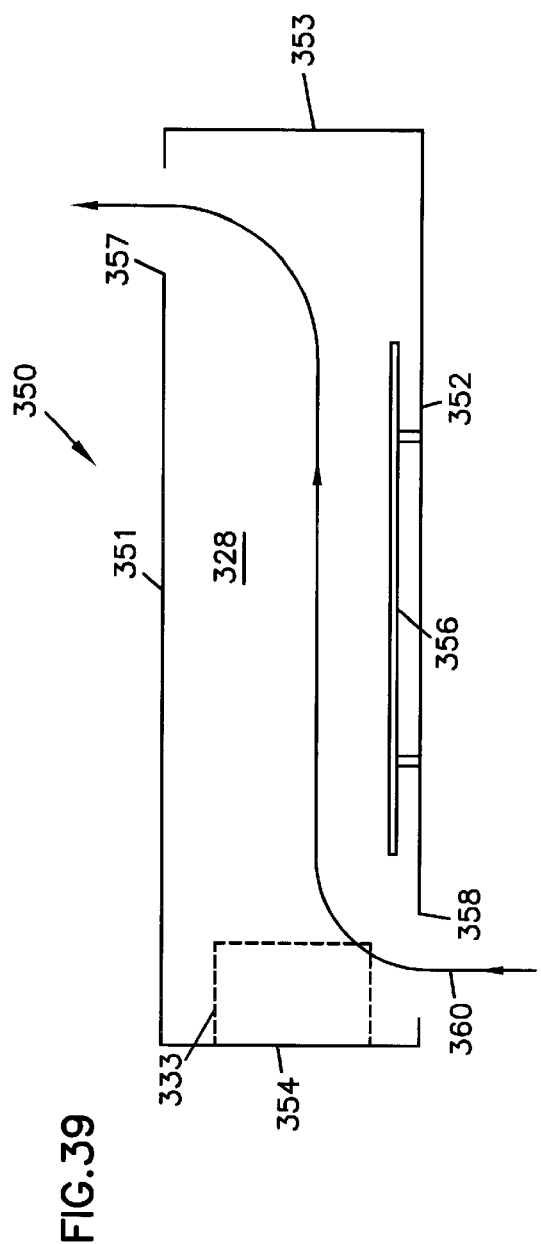
FIG. 39 is a schematic side cross-section of an alternative embodiment of a circuit panel showing the flow path of cooling air through the flame containing slots of the top and bottom surfaces.

FIG. 39 is a circuit panel chassis 350 configured with a top surface 351, a bottom surface 352, a front surface 353, a back surface 354 and two side surfaces (not shown in FIG. 39). These six surfaces define a circuit panel interior 355. An electrical circuit such as circuit board 356 is housed in the interior 355 of the circuit panel chassis. The front and back surfaces 353 and 354 may include one or more holes or openings for receiving connection locations or circuit components. For example, the front surface could comprise modular components as described above. The top surface 351 defines angled slots 357. The bottom surface 352 defines angled bottom slots 358.

In FIG. 39, arrow 360 shows a flow path of air during operation of the circuit panel. The air enters the interior of the panel through bottom slots 358 passes through the interior 355 where it cools the circuit board 356 and rear components 354 and then exits the interior 355 through angled slots 357. The depicted airflow path also allows for heated air produced by other equipment in the rack or frame to pass upwardly through panel chassis 357 and away from the equipment.

The above specification, examples and data provide a description of the invention. Since many embodiments of the invention can be made without departing from the spirit and scope of the invention, the invention resides in the claims hereinafter appended.

What is claimed is:

1. A circuit panel chassis comprising:
   a top and bottom surface;
   a front surface having an array of circuit protection component holder mounting locations;
   a back surface having a power input connector and an array of power output connectors;
   two side surfaces; an electrical circuit providing an electrical path between the power input connector and each power output connector, each electrical path passing through a corresponding circuit protection component holder mounting location, each electrical path discontinuous at the circuit protection component holder mounting location and requiring a circuit protection component at the corresponding circuit protection component holder mounting location to complete the path and provide electrical continuity between the power input connector and each power output connector;
   wherein the top surface defines a plurality of elongated angled slots, each angled slot having a length greater than a width and defining a major axis along the length, and wherein the major axes of the angled slots are at an angle relative to a line perpendicular to the front surface, the slots being angled less than 90 degrees and greater than 0 degrees with respect to the line perpendicular to the front surface; and
   wherein the bottom surface defines at least one vent opening.

2. The chassis of claim 1 wherein the angle is 45 degrees.

3. The chassis of claim 1 wherein the top surface defines two sets of angled slots, a first set of angled slots having major axes at a first angle relative to the line perpendicular to the front surface and a second set of angled slots having major axes at a second angle relative to the line perpendicular to the front surface.

4. The chassis of claim 3 wherein the second angle is the same magnitude as the first angle but in the opposite direction from the line perpendicular to the front surface.

5. The chassis of claim 3 wherein the top surface comprises first and second halves, the halves defined by a line perpendicular to the front surface at a midpoint between the two side surfaces, wherein the first set of angled slots are on the first half of the top surface and the second set of angled slots are on the second half of the top surface.

6. The chassis of claim 1 wherein the plurality of angled slots in the top surface are located in a back quarter of the top surface, the back quarter of the top surface being the quarter of the top surface furthest from the front surface.

7. The chassis of claim 6 wherein the vent opening in the bottom surface defines a plurality of angled bottom slots, wherein the angled bottom slots are at an angle with respect to a line perpendicular to the front surface.

8. The chassis of claim 7 wherein the plurality of angled bottom slots in the bottom surface are located in a front quarter of the bottom surface, the front quarter of the bottom surface being the quarter of the bottom surface closest to the front surface.

9. The chassis of claim 1 wherein the plurality of angled slots in the top surface are located in a back half of the top surface, the back half of the top surface being the half of the top surface furthest from the front surface.

10. The chassis of claim 1 wherein the vent opening in the bottom surface defines a plurality of angled bottom slots, wherein the angled bottom slots are at an angle with respect to a line perpendicular to the front surface.

11. A circuit panel chassis comprising:
    a top surface having a back quarter portion, the back quarter portion of the top surface defining a plurality of elongated angled slots, each angled slot having a greater length than a width and defining a major axis along the length, the major axes of the slots being angled less than 90 degrees and greater than 0 degrees with respect to a line perpendicular to the front surface;
    a bottom surface having a front quarter portion, the front quarter portion of the bottom surface defining a plurality of elongated angled slots, each angled slot having a greater length than a width and defining a major axis along the length, the major axes of the slots being angled less than 90 degrees with respect to the line perpendicular to the front surface;
    two side surfaces;
    a front surface having an array of circuit protection component holder mounting locations;
    a back surface having an array of power output connectors, the back surface also including a power input connector;
    an electrical circuit providing an electrical path between the power input connector and each power output connector, each electrical path passing through a corresponding circuit protection component holder mounting location, each electrical path discontinuous at the circuit protection component holder mounting location and requiring a circuit protection component at the corresponding circuit protection component holder mounting location to complete the path and provide electrical continuity between the power input connector and each power output connector; and
    wherein the top, bottom, side, front and back surfaces define a panel interior for housing the circuit, and wherein air may cool the interior of the panel by passing from outside the panel through the slots in the bottom surface, through the panel interior and out the slots in the top surface.

12. The chassis of claim 11 wherein the major axes of the angled slots in the top surface and the major axes of the angled bottom slots of the bottom surface are angled at an angle of 45 or −45 degrees relative to a line perpendicular to the front and back surfaces.

13. The chassis of claim 12 wherein the major axes of the angled bottom slots are parallel to each other.

14. A power distribution panel comprising:
    a front surface having an array of circuit protection component holder mounting locations;
    a back surface having an array of power output connectors, the back surface also including a power input connector;
    a top surface having a back half adjacent the back surface, the back half defining a plurality of linear, angled ventilation slots, each angled slot having a length greater than a width and defining a major axis along the length, the major axes of the slots being angled less than 90 degrees and greater than 0 degrees with respect to a line perpendicular to the front surface;
    a bottom surface having a front half adjacent to the front surface, the front half defining a plurality of linear angled ventilation slots, each angled slot having a length greater than a width and defining a major axis along the length, the major axes of the slots being angled less than 90 degrees with respect to a line perpendicular to the front surface;

two side surfaces;

an electrical circuit providing an electrical path between the power input connector and each power output connector, each electrical path passing through a corresponding circuit protection component holder mounting location, each electrical path discontinuous at the circuit protection component holder mounting location and requiring a circuit protection component at the corresponding circuit protection component holder mounting location to complete the path and provide electrical continuity between the power input connector and each power output connector;

wherein the top, bottom, side, front, and back surfaces define a panel interior housing the electrical circuit, and wherein air may cool the interior of the panel by passing from outside the panel through the slots in the bottom surface, through the panel interior and out the slots in the top surface; and a mounting bracket extending outwardly from adjacent each side surface for mounting to a rack.

15. A circuit panel chassis comprising:

a top, bottom, front, back and two side surfaces defining a panel interior for housing a circuit;

the top surface having a back quarter portion, the back quarter portion of the top surface defining a plurality of linear slots, the top surface preventing air from escaping the panel interior except through the plurality of linear slots in the back quarter portion of the top surface;

a bottom surface having a front quarter portion, the front quarter portion of the bottom surface defining a plurality of linear slots; the bottom surface preventing air from entering the panel interior except through the plurality of linear slots in the front quarter portion of the bottom surface;

the front surface defining at least one circuit protection component holder mounting location;

the back surface defining at least one power output connector and a power input connector; and an electrical circuit in the interior providing an electrical path between the power input connector and each power output connector, each electrical path passing through a corresponding circuit protection component holder mounting location, each electrical path discontinuous at the circuit protection component holder mounting location and requiring a circuit protection component at the corresponding circuit protection component holder mounting location to complete the path and provide electrical continuity between the power input connector and each power output connector;

wherein air may cool the interior of the panel by passing from outside the panel through the slots in the bottom surface, through the panel interior and out the slots in the top surface.

16. A circuit panel chassis comprising:

a top, bottom, front, back and two side surfaces defining a panel interior for housing a circuit;

the top surface having a front quarter portion, the front quarter portion of the top surface defining a plurality of linear slots, the top surface preventing air from escaping the panel interior except through the plurality of linear slots in the front quarter portion of the top surface;

a bottom surface having a back quarter portion, the back quarter portion of the bottom surface defining a plurality of linear slots; the bottom surface preventing air from entering the panel interior except through the plurality of linear slots in the back quarter portion of the bottom surface;

the front surface defining at least one circuit protection component holder mounting location;

the back surface defining at least one power output connector and a power input connector;

an electrical circuit in the interior providing an electrical path between the power input connector and each power output connector, each electrical path passing through a corresponding circuit protection component holder mounting location, each electrical path discontinuous at the circuit protection component holder mounting location and requiring a circuit protection component at the corresponding circuit protection component holder mounting location to complete the path and provide electrical continuity between the power input connector and each power output connector;

wherein air may cool the interior of the panel by passing from outside the panel through the slots in the bottom surface, through the panel interior and out the slots in the top surface.

17. A power distribution panel comprising;

a front surface having an array of circuit protection component holder mounting locations;

a back surface having an array of output connectors, the back surface also including a power input connector;

a top surface having a back half adjacent the back surface, the back half defining a plurality of ventilation openings, the top surface preventing air from escaping the panel except through the plurality of ventilation openings in the back half of the top surface;

a bottom surface having a front half adjacent to the front surface, the front half defining a plurality of ventilation openings, the bottom surface preventing air from entering or escaping the panel except through the plurality of ventilation openings in the front half of the bottom surface;

two side surfaces;

an electrical circuit providing an electrical path between the power input connector and each power output connector, each electrical path passing through a corresponding circuit protection component holder mounting location each electrical path discontinuous at the circuit protection component holder mounting location and requiring a circuit protection component at the corresponding circuit protection component holder mounting location to complete the path and provide electrical continuity between the power input connector and each power output connector;

wherein the top, bottom, side, front, and back surfaces define a panel interior housing the electrical circuit, and wherein air may cool the interior of the panel by passing from outside the panel through the openings in the bottom surface, through the panel interior and out the openings in the top surface; and a mounting bracket extending outwardly from adjacent each side surface for mounting to a rack.

* * * * *

UNITED STATES PATENT AND TRADEMARK OFFICE
CERTIFICATE OF CORRECTION

PATENT NO.    : 6,501,649 B2
DATED         : December 31, 2002
INVENTOR(S)   : Yanes et al.

It is certified that error appears in the above-identified patent and that said Letters Patent is hereby corrected as shown below:

<u>Title page,</u>
Item [75], Inventors, insert after "Ronald Robert Kurth, Brooklyn Park, MN (US)", -- Luis Sanchez, Col. Alamos De San Lorenzo (Mexico) --

Signed and Sealed this

Sixth Day of April, 2004

JON W. DUDAS
*Acting Director of the United States Patent and Trademark Office*